(12) United States Patent
Ohashi et al.

(10) Patent No.: US 6,449,149 B1
(45) Date of Patent: Sep. 10, 2002

(54) ELECTRONIC EQUIPMENT

(75) Inventors: Shigeo Ohashi, Tsuchiura; Takashi Naganawa; Tadakatsu Nakajima, both of Ibaraki-ken; Tsuyoshi Nakagawa, Hadano; Masaaki Eishima, Ebina; Yoshihiro Kondo, Ibaraki-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/057,339

(22) Filed: Apr. 9, 1998

(30) Foreign Application Priority Data

Apr. 14, 1997 (JP) .............................................. 9-095581

(51) Int. Cl.[7] .................................................. G06F 1/16
(52) U.S. Cl. ...................... 361/687; 361/702; 165/80.3; 165/104.33; 174/15.2; 62/259.2
(58) Field of Search ................................. 361/686, 699, 361/700, 702, 687; 165/80.3, 80.4, 104.33, 185; 62/259.2; 174/15.2

(56) References Cited

U.S. PATENT DOCUMENTS

| | | | | |
|---|---|---|---|---|
| 5,313,362 A | * | 5/1994 | Hatada et al. ............... | 361/709 |
| 5,383,340 A | * | 1/1995 | Larson et al. ............... | 361/700 |
| 5,588,483 A | * | 12/1996 | Ishida ................... | 165/104.33 |
| 5,606,341 A | * | 2/1997 | Aguilera ...................... | 361/699 |
| 5,621,613 A | * | 4/1997 | Haley et al. ................. | 361/687 |
| 5,634,351 A | * | 6/1997 | Larson et al. ............... | 361/700 |
| 5,646,822 A | * | 7/1997 | Bhatia et al. ................ | 361/687 |
| 5,718,282 A | * | 2/1998 | Bhatia et al. ................ | 361/700 |
| 5,757,615 A | * | 5/1998 | Donahoe et al. ............ | 361/687 |
| 5,781,409 A | * | 7/1998 | Mecredy, III ............... | 361/687 |
| 5,822,187 A | * | 10/1998 | Garner et al. ................ | 361/687 |
| 5,828,552 A | * | 10/1998 | Ma ............................. | 361/687 |
| 5,832,987 A | * | 11/1998 | Lowry et al. ........... | 165/104.33 |
| 5,835,348 A | * | 11/1998 | Ishida ......................... | 361/699 |
| 5,872,699 A | * | 2/1999 | Nishii et al. ................ | 361/699 |
| 5,966,286 A | * | 10/1999 | O'Connor et al. .......... | 361/699 |

* cited by examiner

Primary Examiner—Darren Schuberg
Assistant Examiner—Lisa Lea-Edmonds
(74) Attorney, Agent, or Firm—Antonelli, Terry, Stout & Kraus, LLP

(57) ABSTRACT

An electronic equipment includes a first casing on which are mounted a keyboard and a wiring board and a second casing which is rotatably mounted on the first casing by means of a hinge. The cooling structure of the electronic equipment includes one or more elements that is the subject of cooling arranged within the first casing, a first heat-discharging member thermally connected with this element and the first casing, a second heat-discharging member that is arranged in the interior of the second casing, and connection means for thermally connecting the first heat-discharging element and the second heat-discharging element.

18 Claims, 8 Drawing Sheets

ELECTRONIC EQUIPMENT

BACKGROUND OF THE INVENTION

1. Field of the Invention

The present invention relates to an electronic equipment including a first casing provided with a circuit board on which is mounted a heat-emitting element and a heat-discharging sheet that discharges heat from this element, and a second casing accommodating a display device and that is rotatably mounted on the first casing, and more particularly relates to an electronic equipment provided with a cooling structure.

2. Description of the Related Art

As disclosed in Japanese Patent Unexamined Publication No. 7-142886 and Japanese Patent Unexamined Publication No. 8-162576, in examples of the related art in the above technical field, heat is transported from a first casing mounting a heat-emitting element to a second casing accommodating a display device etc. and is discharged from the walls of the second casing.

In Japanese Patent Unexamined Publication No. 7-142886 (Prior art 1), a heat-discharging member mounted on a heat-emitting element accommodated in a casing, and a heat-discharging member provided in a second casing that accommodates a display device etc. are connected by a flexible tube and the heat-emitting element is cooled by driving cooling liquid between the respective heat-discharging members.

On the other hand Japanese Patent Unexamined Publication No. 8-162576 (Prior art 2) discloses a technique in which a hinge that connects a first casing mounting a heat-emitting element and a second casing accommodating a display device etc. is formed of material having high thermal conductivity and a heat-discharging member mounted on a heat-emitting element and a heat-discharging member provided in the second casing and the hinge are thermally connected by means of a high conductivity member, thereby allowing heat transfer to be performed to the second casing so as to increase the area from which the heat from the heat-emitting elements can be discharged.

Currently, in electronic equipments such as portable personal computers, with increased heat emission of the elements due to upgrading of performance, together with advances in reduction in casing thickness and weight and since these electronic equipments are usually battery-driven, it has become necessary to achieve reductions in power consumption of the equipment as a whole.

In Prior art 1, motive power is required in order to drive the liquid. The problem was therefore not considered that this would lead to increased power consumption for the liquid drive and increased weight for the liquid drive device, which result in disadvantages from the point of view of portability. In contrast, prior art 2 was applicable only to a specific heat-emitting element, and if a plurality of heat-emitting elements were to be cooled, a heat path to the hinge had to be provided in respect of each heat-emitting element. Furthermore, in order to decrease the thermal resistance from the heat-emitting element to the hinge, it was necessary to arrange the heat-emitting element and hinge adjacent each other. That is, it was not taken into consideration that an obstacle to obtaining higher performance of the system as a whole was presented by the restrictions in layout on the wiring board of the heat-emitting element due to considerations regarding space for the heat path and distance to the hinge, in order to suppress temperature rise of all the heat-emitting elements and also to suppress temperature rise of casing surfaces such as the keyboard.

Also, in the case of electronic equipments for which portable use is a presupposition, it is necessary not only that the temperature of the keyboard mounted on the casing should be in a suitable range, but also that of device surfaces of the casing that come into frequent direct contact with the user (for example when the equipment is used resting on the knees or legs etc.). However, the problem was not considered that, with increase in the amount of heat resulting from upgraded performance of the elements, rise in temperature occurs of the casing in the vicinity of the location where the elements are mounted, the keyboard mounted on the casing and/or the back surface of the display device whereby heat is transmitted as in the case of prior art 2, giving rise to discomfort of the user. In other words, it was not taken into consideration appropriate distribution of the heat generated to the equipment is needed when the amount of heat generated within the casing increased, in order to guarantee performance by cooling the elements and to keep the temperature of the casing and/or keyboard in a range comfortable for the user during operation.

Furthermore, due to reasons of cost of components and improvement of performance in the case of maintenance or repair etc., in such portable electronic equipment, the system specification may be altered and, accompanying this, the layout of the elements and/or equipment within the casing is often altered; when this is done, the problem arises that large alterations have to be made to the cooling structure, so that production cost is raised and furthermore improved performance is prevented if a sufficient cooling performance cannot be ensured. In particular, consideration was not given to the problem that, in the case of a liquid crystal device typically employed in a display device mounted on a second casing, there are restrictions on the temperature of the device in order to ensure proper display performance, so that proper display performance cannot be achieved unless the amount of heat transmitted to the second casing is regulated such that, in coping with alterations and performance upgrades of the system specification, the upper limit of the display temperature is not exceeded.

SUMMARY OF THE INVENTION

An object of the present invention is to provide an electronic equipment having a cooling structure suited to small-thickness light-weight casings whereby rise in temperature of the surface of the casing accommodating a heat-emitting element and a keyboard etc. can be suppressed and the temperature of the heat-emitting element can be cooled to a predetermined temperature, with no discomfort to the operator, irrespective of the layout on the wiring board of the heat-emitting element and/or the layout of equipment items within the casing.

A further object of the present invention is to provide an electronic equipment having a cooling structure capable of maintaining the casing and keyboard at a temperature at which there is no discomfort to the operator whilst the heat-emitting element is maintained below a predetermined temperature and the amount of heat generated from the heat-emitting element and/or device within the casing is suitably dispersed in the entire equipment.

Yet a further object is to provide an electronic equipment having a cooling structure whereby the amount of heat emitted from the casing can be regulated to cope with changes in the layout of heat-emitting elements and/or equipment within the casing.

In order to solve the above problems, an electronic equipment according to the present application comprises a first casing on which are mounted a keyboard and a wiring board, and a second casing accommodating a display device and rotatably mounted on the first casing by means of a hinge, and further comprises a first heat-discharging member thermally connected with one or more elements that are the subject of cooling arranged within the first casing and the surface of the first casing, a second heat-discharging member arranged within the second casing, and means for connection that thermally connects the first and the second heat-discharging members. Further, there is provided a construction comprising a flexible thermally conductive member provided between the element that is the subject of cooling and the first heat-discharging member. Also, there is provided a construction comprising a heat-discharging member arranged between a plurality of or a single one of the elements that are the subject of cooling and the keyboard and thermally contacting the elements that are the subject of cooling and the keyboard.

Also, a construction may be provided in which an electronic equipment comprises a first casing on which are mounted a keyboard and a wiring board, and a second casing accommodating a display device and rotatably mounted on the first casing by means of a hinge, and further comprising a thermally conductive member thermally connected with one or more elements that are the subject of cooling arranged within the first casing and the surface of said first casing, and connection means for thermally connecting the first casing and second casing.

Further, the connection means may comprise a thermally conductive member connected by contacting the first heat-discharging member and the second heat-discharging member and further comprise a thermally conductive member comprising one or other of a thermally conductive member connected to the first heat-discharging member and a thermally conductive member connected to the second heat-discharging member and connected in contact with these thermally conductive members or heat-discharging member.

Furthermore the size of the region of contact of the means for contact may be adjustable.

The first heat-discharging member receives the heat of a plurality of heat-emitting elements on the wiring board and part of this is discharged from the surface of the first casing through a heat-discharging path provided by thermal connection between the first heat-discharging member and the surface of the casing to the atmosphere. The rest of the heat is thermally conducted to the second heat-discharging member through the connection of the first heat-discharging member and second heat-discharging member and is discharged to the atmosphere from the surface of the second casing. At this time, the first heat-discharging member receives the heat of the plurality of elements concurrently, so the heat of the plurality of elements that are thermally connected to the first heat-discharging member is discharged from the surface of the first casing and the surface of the second casing irrespective of their layout on the wiring board. A layout of the elements such as to achieve high performance of the system can therefore be achieved without lowering the cooling performance of the heat-emitting elements on the wiring board and large-scale alterations to the cooling structure are not necessary even if the heat-emitting elements and/or wiring board are altered due to alteration of the specification of the system.

Also, the heat generated from heat-emitting elements and/or device within the first casing is discharged to the outside from the first heat-discharging member by being transmitted to the first casing or the keyboard. Concurrently, it is discharged to the outside from the second casing, which is thermally connected to this first heat-discharging member. That is, since the heat generated in the interior of the casing is distributed to all the surfaces before being discharged to the outside, the casing where it is touched by persons is appropriately cooled at the same time as cooling of the elements, without either local rise in temperature of the surface of the casing or rise in temperature to the point of causing discomfort to the user.

DETAILED DESCRIPTION OF THE PREFERRED EMBODIMENTS

Embodiments of the present invention are described below with reference to the drawings.

Figure 1:
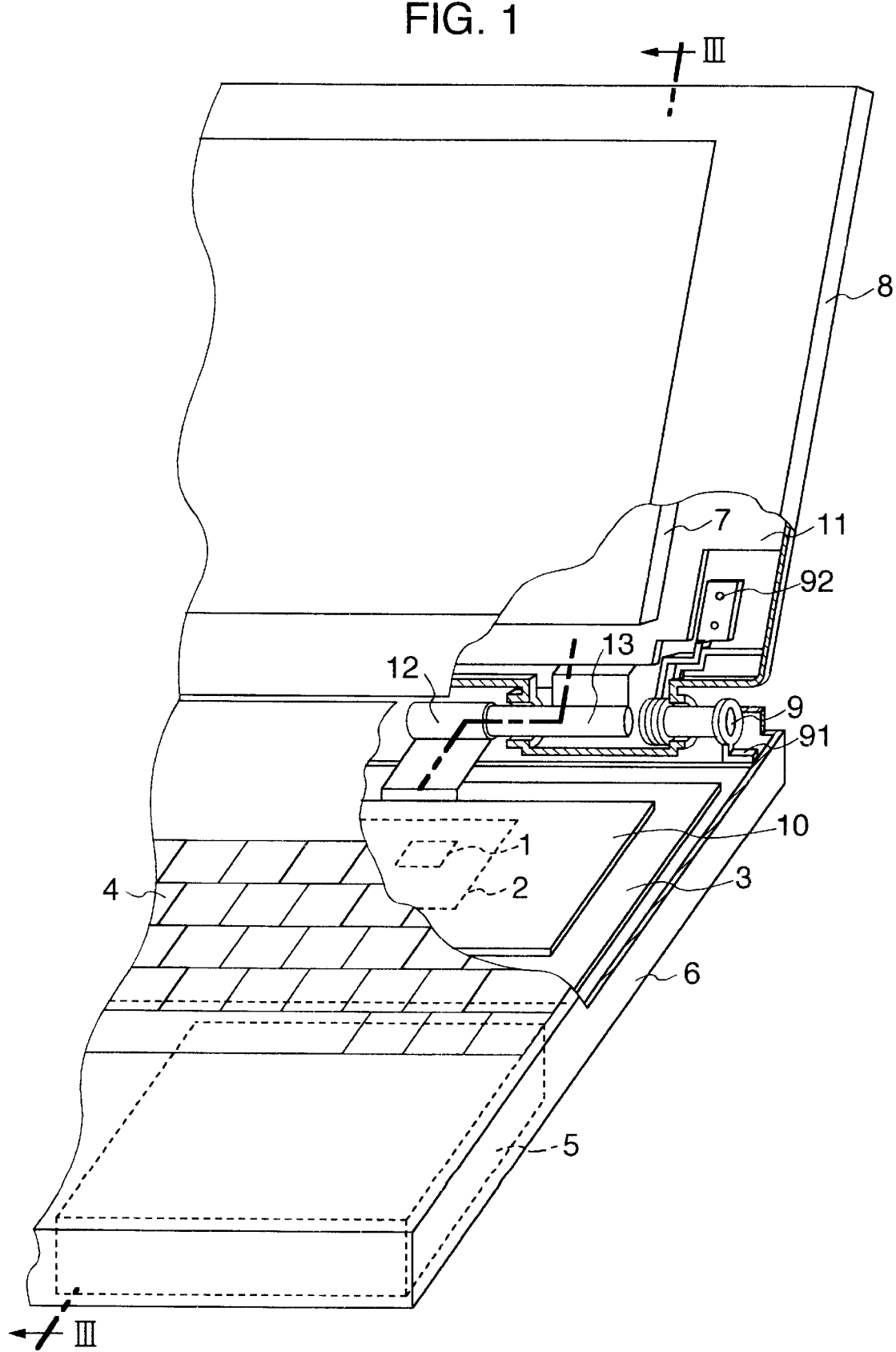
FIG. 1 is a perspective cross-sectional view of an electronic equipment according to an embodiment of the present invention.
Figure 2:
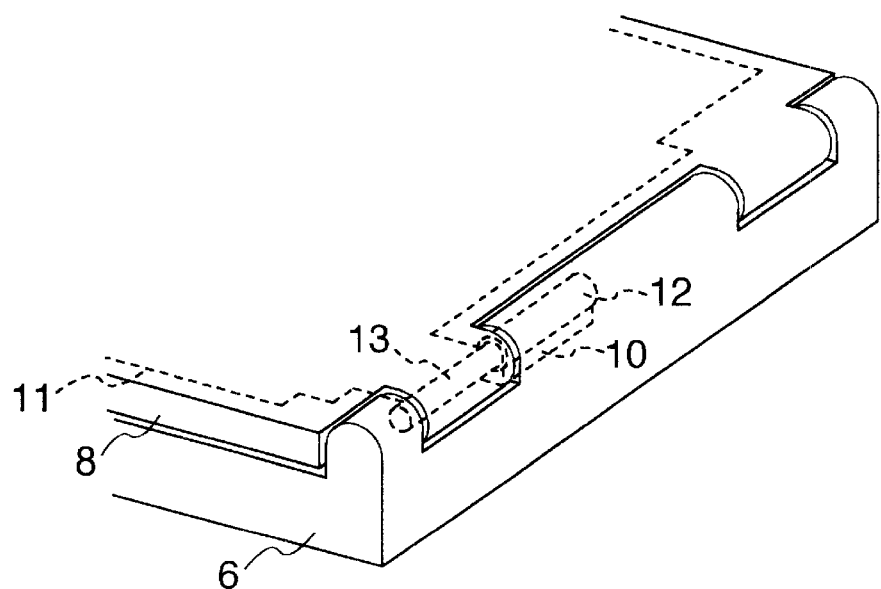
FIG. 2 is a rear perspective view of the electronic equipment shown in FIG. 1.
Figure 3:
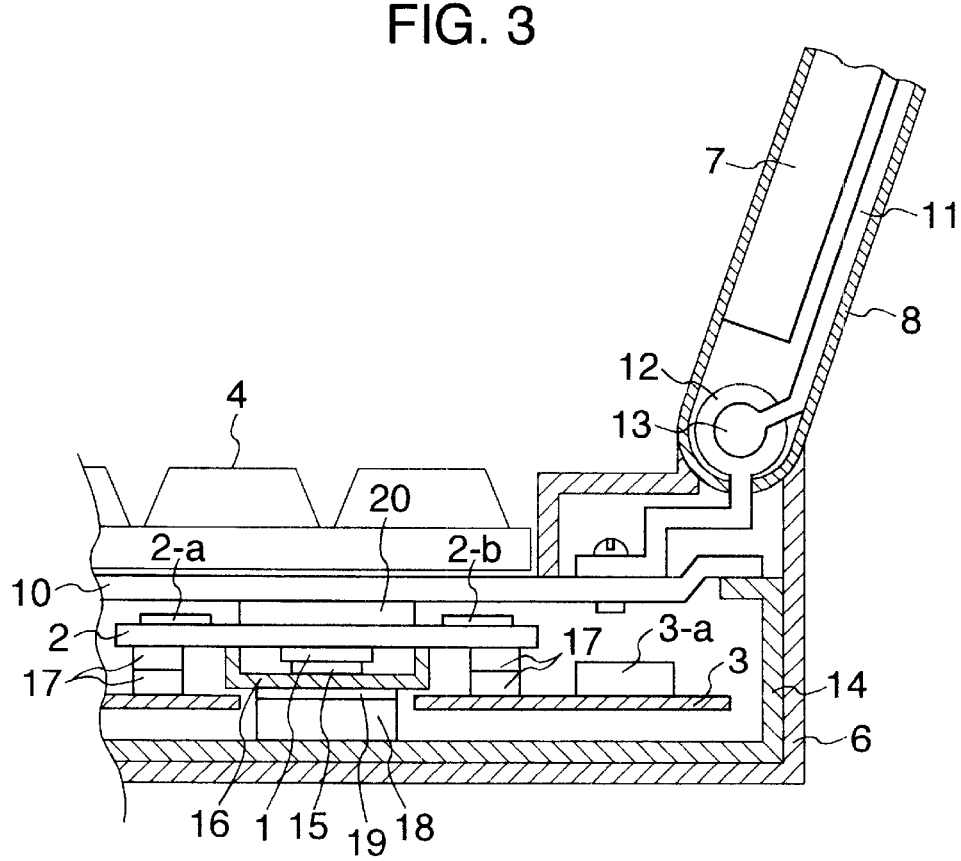
FIG. 3 is a transverse cross-sectional view taken along the line III—III of FIG. 1.
Figure 4:
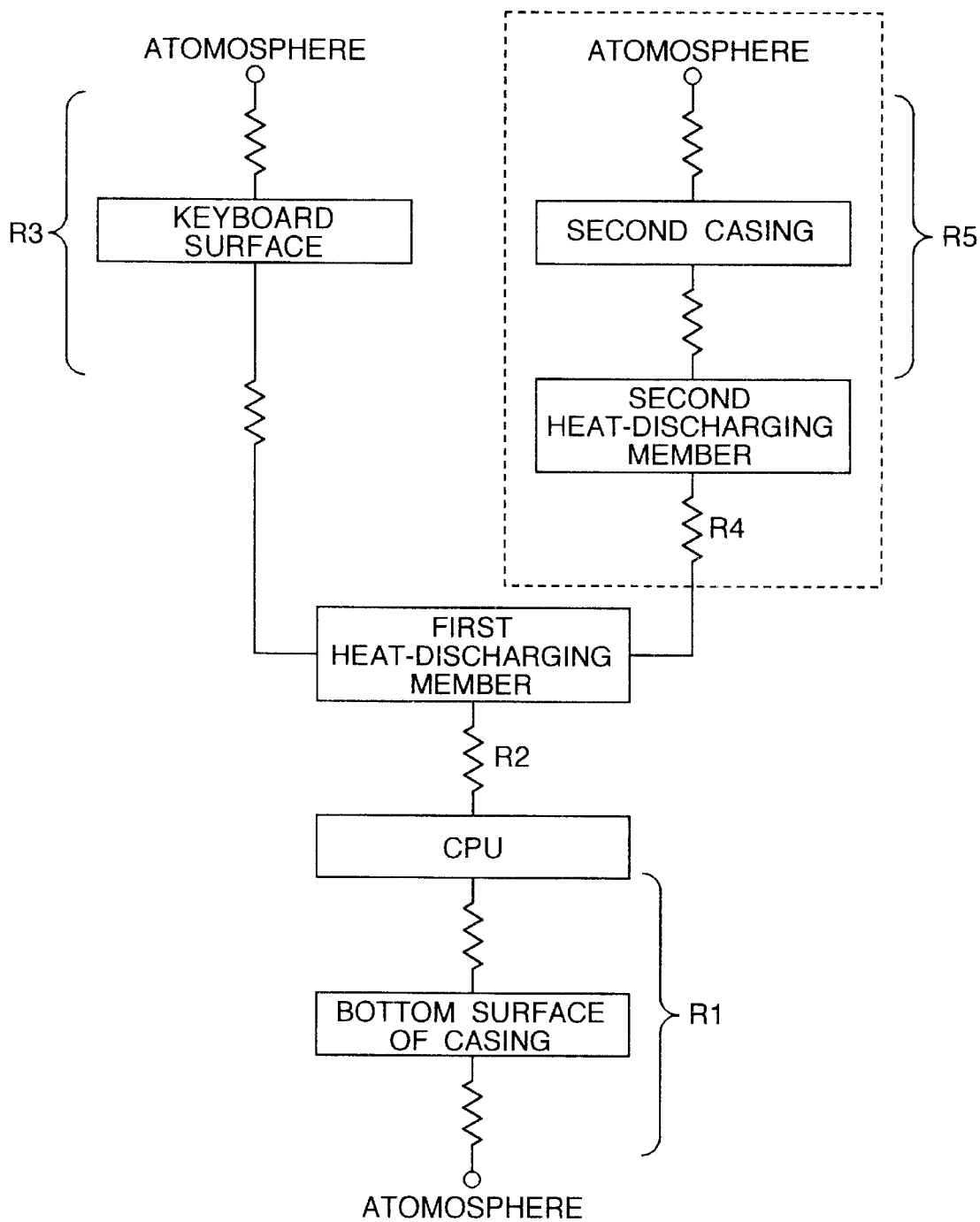
FIG. 4 is a diagram of the thermal resistance circuit of the electronic equipment shown in FIG. 1.

A first embodiment of the present invention is illustrated in FIGS. 1 to 3 and a thermal resistance circuit diagram of this embodiment is illustrated in FIG. 4. FIG. 1 is an internal perspective view of a thin electronic equipment typified by a portable personal computer. FIG. 2 is a rear perspective view of the embodiment of an electronic equipment shown in FIG. 1; FIG. 3 is a transverse cross-sectional view showing the interior of the embodiment of an electronic equipment shown in FIG. 1; and FIG. 4 is a schematic diagram showing a thermal resistance circuit of the electronic equipment shown in FIG. 1.

The electronic equipment of this embodiment comprises a sub-wiring board 2 on which are mounted a plurality of elements including an element 1 that emits a particularly large amount of heat, such as a CPU (Central Processing Unit) (hereinbelow referred to as a CPU), a main circuit board 3 on which are mounted a sub-wiring board 2 and a plurality of elements, a keyboard 4, a first casing 6 accommodating a storage device 5 etc., and a second casing 8 accommodating a display device 7. First casing 6 and second casing 8 are mounted in mutually rotatable manner by means of hinges 9 at the two respective edges of the casings (only one edge shown in FIG. 1) 91 and 92. Above CPU 1 there is arranged a first heat-discharging member 10 thermally connected to CPU 1, and within second casing 8, a second heat-discharging member 11 is arranged between display device 7 and the casing wall of second casing 8.

First heat-discharging element 10 is a sheet-shaped member of high thermal conductivity such as aluminium or copper, and has a cylindrically-shaped section 12 at its end. The cylindrically-shaped section 12 is formed by the method of metallically joining a cylindrical member to a sheet-shaped member, the method of rounding the end of a sheet-shaped member into a cylindrical shape, a die-cast forming method etc. The second heat-discharging member 11 is also a sheet-shaped member of high thermal conductivity such as aluminium or copper, and has a cylindrical pillar 13 at its end. The cylindrical pillar 13 is formed by a method such as metallically joining a cylindrical member to a sheet-shaped member, a method of die-cast forming or the like. The first heat-discharging member 10 and second heat-discharging member 11 are connected by fitting cylindrical section 12 and cylindrical pillar 13 together, cylindrical pillar 13 reaching the end (in FIG. 1 the left end) of cylindrical section 12 of first heat-discharging member 10. The cylindrical pillar 13 is mounted coaxially with the rotating shaft of hinge 9. The junction of the cylindrical section 12 and the cylindrical pillar 13 is accommodated in first casing 6 and the junction of second heat-discharging member 11 and cylindrical pillar 13 is accommodated in second casing 8.

This structure is also shown in FIG. 2 by a rear perspective view in the case in which the display section is closed. Since the joint of second heat-discharging member 11 with cylindrical pillar 13 and cylindrically-shaped section 12 provided on first heat-discharging member 10 are fitted together at different locations on cylindrical pillar 13, irrespective of the angle of first casing 6 and second casing 8, a casing can be formed without first and second heat-discharging members (13 and 12) that reach high temperature (about 70° C.) due to the heat of the CPU being exposed to the outside. Also, the external appearance is not spoilt.

Furthermore, although not shown in FIG. 1, in the hinge at the other end (left end in FIG. 1), a signal lead electrically connecting display device 7 and main circuit board 3 is passed through from first casing 6 to second casing 8.

Next, the heat-discharging structure of this embodiment will be further described using FIG. 3.

FIG. 3 is a transverse cross-sectional view taken along the line III—III of FIG. 1 showing the interior of this embodiment. A heat-discharging sheet 14 constituted of heat-discharging member is provided at the bottom surface of first casing 6. The amount of heat discharged and the amount of heat conducted by heat-discharging sheet 14 depend greatly on its area, so, if necessary, it is of practically the same area as the bottom surface of the casing and is arranged as far as the rear face of the casing. In particular, by making the area large, the degrees of freedom of layout of elements on the circuit board can be increased. Furthermore, if the casing 6 is made of metal such as Mg metal, a wall surface itself of the casing may be commonly used as provides a function of the heat-discharging plate 14. CPU 1 is installed on sub-wiring board 2 and an expansion metal sheet 16 is mounted on the other side of a flexible heat-conducting member (consisting of for example a filler such as aluminium oxide mixed with Si rubber). Sub-wiring board 2 is mounted on main circuit board 3 by means of a connector 17. Expansion metal sheet 16 is then thermally connected by contacting heat-discharging block 18 which is arranged on heat-discharging sheet 14, by means of flexible heat-conducting member 19, passing through main circuit board 3. Heat-discharging member 10 is arranged on the rear face of sub-circuit board 2 on which is mounted CPU 1, directly below keyboard 4, with a flexible thermally conducting member 20 arranged therebetween. Heat-discharging member 10 and the base section of the keyboard (it is desirable that this should be of metal of high thermal conductivity) are in contact or thermally connected through a flexible heat conducting member (not shown) or the like. Heat-discharging member 10 could be the base section itself of the keyboard.

It is desirable that heat-discharging member 10 should be of an area as wide as possible from the heat-emitting elements in order that this can be arranged so as to cover a plurality of heat-emitting elements such as heat-emitting elements 2-a, 2-b on the sub-circuit board 2 and heat-emitting element 3-a on the main circuit board 3. Furthermore, heat-discharging member 10 has a cylindrical section 12 at its end. Furthermore, also within second casing 8 that accommodates the display device 7, the second heat-discharging member 11 having the cylindrical pillar 13 at its end is arranged at the back surface within the casing. A gap (air insulation layer) is formed between the heat-discharging member 11 and the display device 7 so that the heat-discharging member 11 does not heat up the display device 7. Furthermore, if the casing 8 is made of metal such as a Mg alloy, the wall surface itself of the casing may be commonly used as provides a function of the second heat-discharging member 11. The cylindrical section 12 of the heat-discharging member 10 and the cylindrical pillar 13 of heat-discharging member 11 are connected by insertion-fitting, so that the second casing 8 is rotatable with respect to first casing 6 about the cylindrical pillar 13 as centre (on the same straight line as the hinge shaft that connects the first casing 6 and the second casing 8). The heat discharging ability of the connecting section (cylindrical section 12) of heat-discharging member 10 and heat-discharging member 11 can of course be improved by making it integral with the heat-discharging members, but, in order to improve ease of assembly, it is demountably mounted by a method such as a stop screw.

The heat-discharging effect of expansion metal sheet 16, heat-discharging sheet 14, and heat-discharging members 10 and 11 is improved by dispersion of heat in the direction of the surface. The heat that is generated by CPU 1 is distributed into heat that is discharged to the atmosphere through flexible thermally conducting member 15, expansion metal sheet 16, flexible thermally conducting member 19, heat-discharging block 18, and heat-discharging sheet 14 from the bottom surface of casing 6, and the heat that is discharged through sub-circuit board 2, flexible thermally conducting member 20, and heat-discharging member 10. Furthermore, heat-discharging member 10 is thermally connected with a plurality of heat-emitting elements such as heat-emitting elements 2-a, 2-b on sub-circuit board 2 and heat-emitting element 3-a on main circuit board 3. Heat from the plurality of heat-emitting elements such as heat-emitting elements 2-*a*, 2-*b* on sub-circuit board 2 and heat-emitting element 3-*a* of main circuit board 3 is transmitted to heat-discharging member 10 directly by thermal conduction in the air or by radiation, or indirectly by thermal conduction into the circuit board. Of the heat that is transmitted to heat-discharging member 10, some is discharged to the atmosphere through keyboard 4 while the rest is thermally conducted to heat-discharging member 11 from the insertion-fitting sections (12 and 13) of heat-discharging member 10 and heat-discharging member 11 and is discharged to the atmosphere through the wall of the second casing 8. It should be noted that, since heat-discharging member 10 is arranged covering the plurality of heat-emitting elements on sub-circuit board 2 and main circuit board 3, the heat of the elements on the respective circuit boards is transmitted to heat-discharging member 10 irrespective of the positions in which the elements are arranged within sub-circuit board 2 or the position in which sub-circuit board 2 is mounted on main circuit board 3.

FIG. 4 is a diagram showing the heat resistance circuit in this embodiment and is given in explanation of the benefits of this embodiment. From the CPU to the atmosphere, there are a large number of heat paths in complex relationship, but, indicating the portions whose mutual effect is greatest, these may be divided into a first heat-discharging path whereby heat is discharged from the CPU to the atmosphere through the heat-discharging member at the bottom surface and the bottom surface of the first casing (thermal resistance: $R1$), and a second heat-discharging path whereby heat is discharged from the CPU through the heat-discharging member on the keyboard side constituting a first heat-discharging member (thermal resistance: $R2$). It should be noted that, as mentioned above, these heat-discharging members within the first casing also receive heat from heat-emitting elements other than the CPU, but, for the sake of simplicity, the description will concentrate on emission of heat by the CPU.

The first path whereby heat is discharged from the CPU through the heat-discharging member on the keyboard side may be further divided into the second path whereby heat is discharged to the atmosphere through the keyboard surface from the first heat-discharging member (thermal resistance: $R3$) and a third heat-discharging path (thermal resistance: $R5$) whereby heat is discharged to the atmosphere through the rear face of the second casing accommodating the display device from the second heat-discharging member through the insertion-fitting section (thermal resistance: $R4$) of the first heat-discharging member and second heat-discharging member. Typical approximate magnitudes of these respective thermal resistances at the current technical level are $R1=16°$ C./W, $R2=6°$ C./W, $R3=8°$ C./W and $R5=10°$ C./W. The thermal resistance $R4$ of the insertion-fitting section of the first heat-discharging member and second heat-discharging member is $R4$=about 3.7° C./W when for example the respective materials are aluminium, the internal and external diameter of the cylindrically-shaped section are respectively 4 mm and 6 mm, the gap is 10 $\mu$m, and the insertion length is 15 mm. Consequently, the total thermal resistance R from the CPU to the atmosphere is $R=1/(1/R1+1/(R2+R3\cdot(R4+R5)/(R3+R4+R5)))$=about 6.5° C./W. The amount of heat generated by a typical current CPU is about 8 W and the amount of heat generated by future CPUs will tend to increase, so finding the approximate amounts of heat discharged by using these values, the amount of heat discharged to the atmosphere from the bottom surface of the casing is 3.3 W, the amount of heat discharged to the atmosphere from the keyboard surface is 3.0 W, and the amount of heat discharged to the atmosphere from the rear face of the second casing is 1.7 W. Also, if the atmosphere temperature is 35° C., the CPU temperature becomes 87° C. In contrast, if the present invention is not employed i.e. if the heat-discharging path enclosed by the broken lines in FIG. 4 is absent, the total resistance R is $R=1/(1/R1+1/(R2+R3))$=7.5° C./W. In this case the amount of heat discharged to the atmosphere from the bottom surface of the casing is 3.7 W and the amount of heat discharged to the atmosphere from the upper surface of the keyboard is 4.3 W, resulting in a CPU temperature of 95° C. Consequently, in the case of this embodiment of the present invention, compared with the case where the above construction of the present invention is not employed, the CPU temperature can be reduced by 13% (in terms of the temperature difference with the atmosphere) and the amount of heat discharged from the keyboard surface can be reduced by 30%.

Now let us consider the temperature of the keyboard surface that is touched by the user or operator. In this embodiment of the invention, the amount of heat discharged from the keyboard surface is reduced from 4.3 W to 3.0 W. Consequently, taking into account the thermal resistance (current typical value: about 3° C./W) from the keyboard surface to the atmosphere, the rise in temperature of the keyboard surface from the atmosphere temperature is reduced from 12.9° C. to 9.0° C. i.e. the temperature difference with the atmosphere can be kept below the 10° C. which has been experimentally found to cause discomfort. That is, for a CPU whose heat generation rate is more than 8 W, the thermal resistances of the various parts can be designed such that the amount of heat discharged from the keyboard surface is kept below 3.3 W by transferring an amount of heat of more than 1.7 W to the second casing in order to restrain the rise in temperature of the keyboard surface from the atmosphere temperature to under 10° C.

The resistance $R4$ of the insertion-fitting section of the first heat-discharging member and second heat-discharging member depends on the magnitude of the gap of the insertion-fitting of the cylindrically-shaped section and cylindrical pillar, and on the insertion length. As an example, if the respective materials are aluminium and the internal diameter and external diameter of the cylindrically-shaped sections are respectively 4 mm and 6 mm, the thermal resistance $R4$ may be found as follows depending on the magnitude of the insertion-fitting gap and the insertion length. Specifically, $R4$ (° C./W) when the magnitude of the gap is changed to 10, 20, and 30 ($\mu$m) respectively is 3.7, 5.9, and 9.6 (where the insertion length is fixed at 15 mm). On the other hand, $R4$ (° C./W) in the case where the insertion length is altered to 10, 15, and 20 mm respectively is 4.6, 3.7, and 3.6 (if the gap is fixed at 15 $\mu$m). If metal is employed, a gap of about 10~30 $\mu$m can very easily be obtained with ordinary mechanical processing precision. In the above, the case was described in which heat transfer between the cylindrical pillar member and cylindrical member was achieved through an air layer; however, thermal resistance can be greatly reduced by interposing a thermally conductive grease or oil. For example, if the gap is 10 $\mu$m and the insertion length is 15 mm, if a thermally conductive grease is interposed, $R4=1.2°$ C./w i.e. it can be reduced by a factor of about ⅓.

With the construction as described above, the heat generated in the interior of the first casing is discharged by being transferred from a heat-discharging member at the bottom surface of the first casing or a heat-discharging member on the back surface of the keyboard through means for connection to a heat-discharging member of the second casing, so the amount of heat that is transmitted to the bottom surface of the first casing or portions, keyboard and so on that are actually touched by the user is reduced, thereby enabling the temperature of these to be kept below a temperature that is uncomfortable for the user and so enabling comfort during use to be improved.

Also, since the first heat-discharging member of the first casing has an area that covers a plurality of elements and extends in an area for example about the same as that of the main circuit board or the same as that of the bottom surface of the first casing, the heat of a plurality of elements that are thermally connected to the first heat-discharging member is conducted to the second heat-discharging member in a reliable manner from the means for connection regardless of the layout of the elements. Specifically, restrictions from the point of view of cooling and/or heat discharging on the layout of elements within the interior of the first casing and hence on the layout of equipment including circuit boards can be greatly reduced, enabling a layout of the elements and/or equipment to be adopted that is most suited to achieving high performance of system operation and that can cope with alterations of wiring for the heat-emitting elements and/or circuit boards resulting from system specification alterations or on maintenance, without greatly altering the cooling construction: construction costs can therefore be reduced. Furthermore, since the heat from heat-emitting elements on the sub-circuit board is made to pass through the main circuit board, whence it is conducted to the first heat-discharging member, the degrees of freedom not only in the planar layout on the circuit board but also in the vertical direction of the circuit board are increased i.e. the degrees of freedom of the elements and/or equipment are further increased since the heat of the heat-emitting elements can be conducted to both the keyboard and the bottom surface: thus an arrangement can be achieved that is beneficial in terms of manufacturing costs and achieving higher performance.

Also, the heat generated from the heat-emitting elements and/or equipment within the first casing is conducted from the first heat-discharging member (on the bottom surface side of the casing or on the keyboard side of the elements) to the first casing or to the keyboard, whence it is discharged to the outside. At the same time, it is discharged from the second casing that is thermally connected to the first heat-discharging member to the outside. That is, since the heat that is generated within the casing is discharged to the outside from the upper surfaces of the casing after being dispersed within the casing, there is no possibility of local heating of the upper surface of the casing or of heating to such an extent as to cause discomfort to the user; thus, not only can the elements be cooled but also the casing where it is touched by human beings can be appropriately cooled.

Also, by making it possible to adjust the area of contact of both heat-discharging members at the junction of the first and second heat-discharging members i.e. the area of thermal conduction, the amount of heat discharged to the outside from the first and second heat-discharging members can be adjusted to cope with performance upgrades and/or increases in the amount of heat generated by the heat-emitting elements without needing to greatly alter the cooling structure: thus the distribution whereby the amount of heat emitted from the interior of the casing is distributed to the entire casing can be adjusted in a simple manner.

Figure 7:
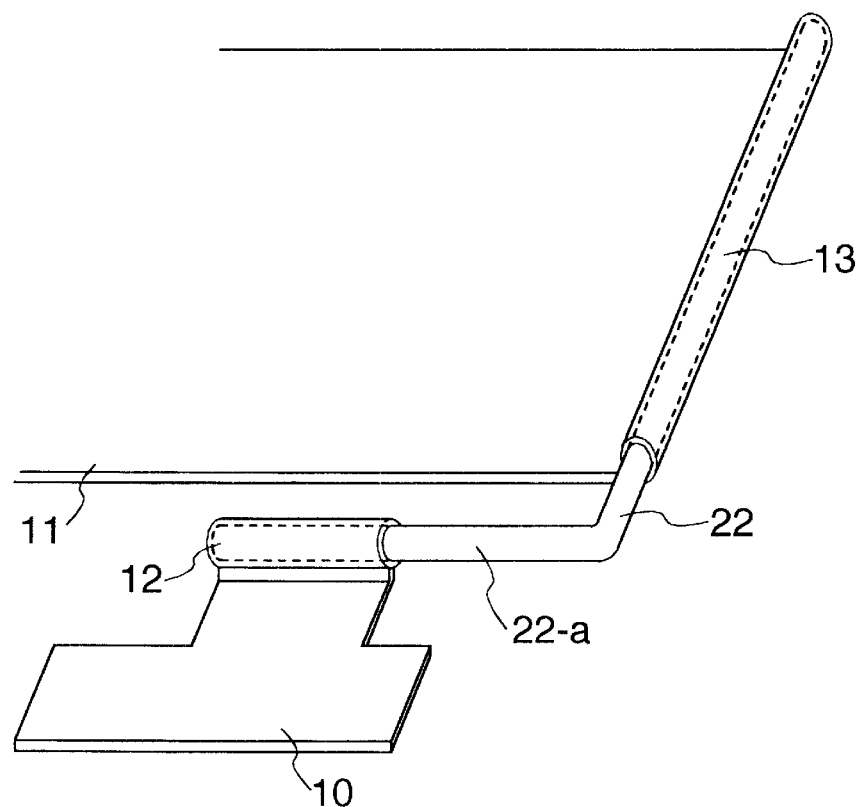
FIG. 7 is a perspective cross-sectional view of connection means of another heat-discharging member in an electronic equipment according to the present invention.

FIG. 7 is a perspective view showing a third embodiment of an electronic equipment according to the present invention.

According to the heat circuit diagram of the first embodiment described in FIG. 4, the reduction of the thermal resistance (R4+R5) from the contact member of the first heat-discharging member and second heat-discharging member through the second heat-discharging member as far as the wall surface of the second casing is beneficial in reducing the temperature of the CPU and in reducing the amount of heat discharged from the keyboard. Specifically, in the above embodiment, heat is conducted to the second heat-discharging member side from the connecting portion of the connecting members of the first and second heat-discharging members. Consequently, by making the connection area at this connecting portion as large as possible, R4 is reduced and, as in the first embodiment, when the connecting member does not directly support the first and second casings in the case where they are connected each other a construction with better heat conduction efficiency can be obtained, so for example an arrangement in which a tube structure is adopted is shown in FIG. 7. FIG. 7 is a perspective view showing a first embodiment of an electronic equipment according to the present invention.

In the embodiment shown in FIG. 7, there is illustrated only the first heat-discharging member 10 that is accommodated in the first casing and is thermally connected to the CPU and the second heat-discharging member 11 that is accommodated in the second casing and that is arranged between the display device and the wall surface of the casing. First heat-discharging member 10 that is thermally connected to the CPU and second heat-discharging member 11 are respectively provided with cylindrically-shaped sections 12 and 13 at their ends. Cylindrically-shaped sections 12 and 13 are insertion-fitted on to a heat pipe 22 bent in L shape. Cylindrically-shaped section 12 of first heat-discharging member 10 and heat pipe 22 are insertion-fitted with the provision of a gap (about 10~20 $\mu$m) so that rotation is possible about heat pipe 22. In installation into the casing, the axis of rotation of the hinge and this heat pipe rotating shaft 22-$a$ are arranged on the same straight line. Cylindrically-shaped section 13 of second heat-discharging member 11 and heat pipe 22 are fixed by swaging to round the entire end of second heat-discharging member 11.

In this embodiment, the heat of the CPU that is thermally conducted to heat pipe rotation shaft 22-$a$ through first heat-discharging member 10 is transmitted to the entire end of second heat-discharging member 11 by means of the heat pipe, so dispersion of heat to the entire second heat-discharging member 11 can be performed efficiently. The thermal resistance from the first heat-discharging member through the second heat-discharging member to the wall face of the second casing can therefore be reduced.

In the above embodiments, for convenience in description, the case was described in which the heat-discharging member on the keyboard side constituted first heat-discharging member 10; however, there is no difference with respect to the technical concept of the invention disclosed in this specification if heat-discharging member 14 on the bottom surface side of the first casing is taken as being the first heat-discharging member.

Normally the electrical connection between display device 7 and main circuit board 3 is implemented by a large number of signal lines. Consequently, depending on the type of machine, signal lines 21 are passed from the first casing 6 to the second casing 8 at both edges of the casings where hinge 9 is provided. In the first embodiment described above, the arrangement of the construction whereby heat is transferred from first casing 6 to second casing 8 at a single hinge section and the wiring for the signal lines cannot be performed concurrently. It would therefore be desirable for a construction to be adopted whereby signal wiring and thermal conduction are performed at the same connecting portion by simultaneously implementing the construction for conducting heat from first casing 6 to second casing 8 and the wiring of signal lines 21 at the hinge section. Such an embodiment is shown in FIG. 5 and FIG. 6.

Figure 5:
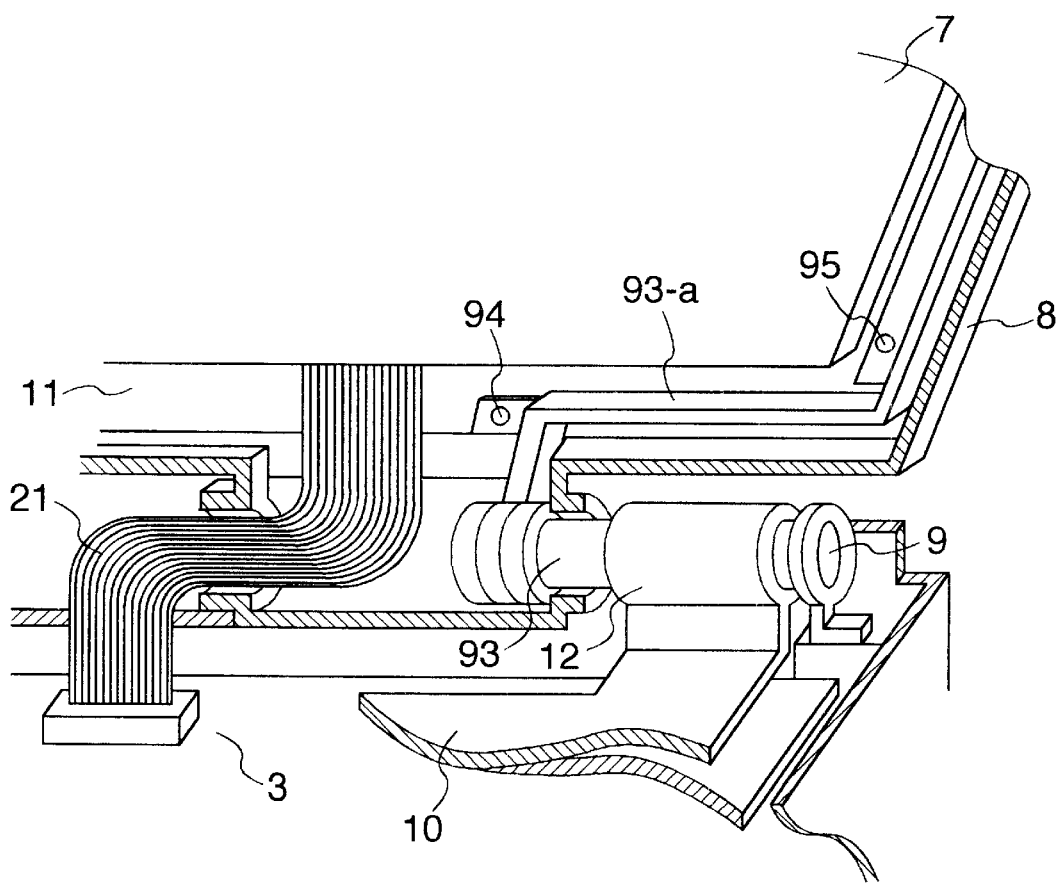
FIG. 5 is a cross-sectional perspective view of another embodiment of an electronic equipment according to the present invention.
Figure 6:
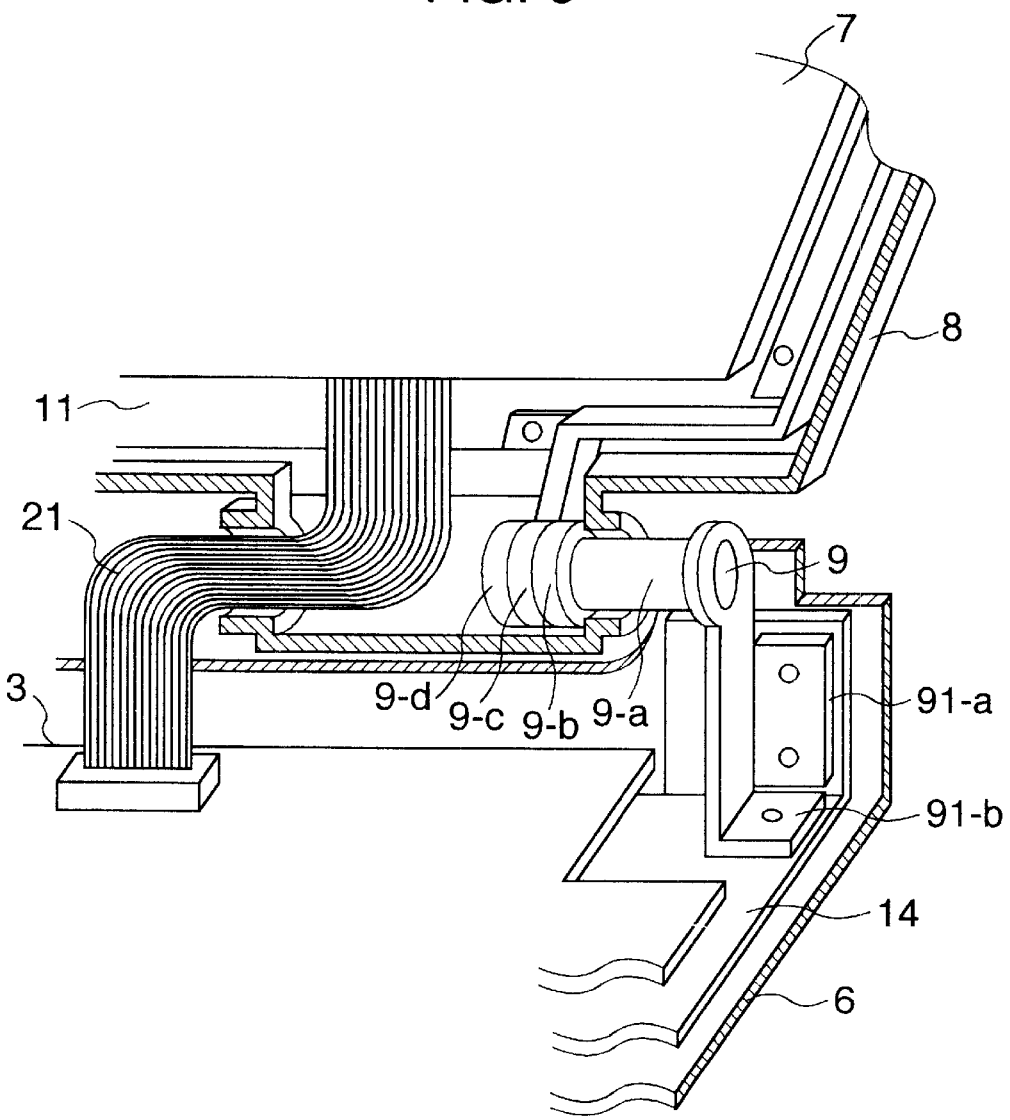
FIG. 6 is a cross-sectional perspective view of connection means of a heat-discharging member in the electronic equipment shown in FIG. 5.

FIG. 5 and FIG. 6 which are next illustrated are perspective sectional views showing a second embodiment of the present invention relating to an electronic equipment.

Just as in the case of the example shown in FIG. 1, first heat-discharging member 10 that is thermally connected with the CPU has at its end a cylindrically-shaped section 12. Cylindrically-shaped section 12 is insertion-fitted on to the shaft 93 of hinge 9 with a suitable gap, for example a gap of about 10~20 μm, such that it can rotate about shaft 93. Within second casing 8, second heat-discharging member 11 is arranged between display device 7 and the casing wall of second casing 8; second heat-discharging member 11 and member 93-*a* (preferably integrated with hinge shaft 93) are fixed for by example screws 94, 95 with second casing 8. Of the heat generated by the CPU, some is discharged to the atmosphere from the upper surface of the keyboard (not shown) which is arranged above first heat-discharging member 10 while the rest of the heat is thermally conducted to second heat-discharging member 11 through the shaft of hinge 9 and is discharged to the atmosphere from the casing wall of second casing 8.

In the embodiment shown in FIG. 5, hinge 9 itself was utilized as a thermally conducting member; however, it would be possible to simplify the construction and so lower costs by dispensing with first heat-discharging member 10 mounted on the hinge shaft, albeit with some loss of heat-discharging performance. Such an embodiment is shown in FIG. 6. In this embodiment, hinge 9 is formed of material of high thermal conductivity and high mechanical strength and hinge legs 91-*a*, 91-*b* are fixed to first casing 6 and a heat-discharging sheet 14 that is provided at the bottom of first casing 6. The internal construction of second casing 8 is the same as in the case of FIG. 5. Flanges 9-*b*, 9-*d* integrally formed with shaft 9-*a* of hinge 9 create reinforcement by being pressed against member 9-*c* that is connected to second casing 8. Although not shown in the drawings, the contact area with shaft 9-*a* is increased by means of a member that presses member 9-*c* by gripping this with flanges 9-*b*, 9-*d* and further by the fact that the width of section 9-*c* increases in the direction of shaft 9-*a* ; the thermal resistance of shaft 9-*c* and section 9-*a* is thereby decreased. Some of the heat generated by the CPU is thermally conducted from a heat-discharging sheet through the legs 91-*a*, 91-*b* of the hinge and hinge shaft 9-*a* to the second heat-discharging member 11 arranged within second casing 8. Consequently, with this embodiment, some of the heat of the CPU can be discharged to the atmosphere from the second casing simply by means of hinge 9. The heat-discharging performance obtained by this embodiment can of course be increased by combining it with the other embodiments.

Figure 8:
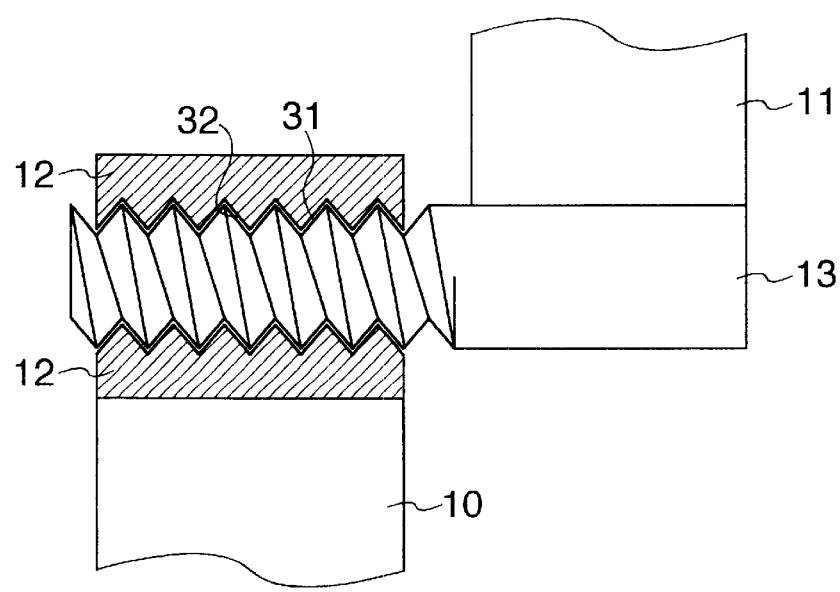
FIG. 8 is a perspective cross-sectional view of connection means of yet another heat-discharging member of an electronic equipment according to the present invention.
Figure 9:
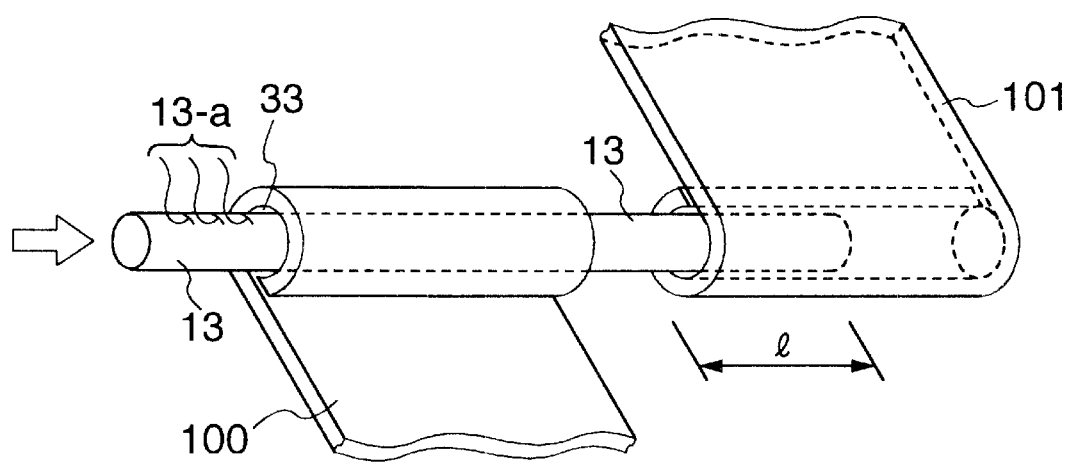
FIG. 9 is a perspective view of connection means of another heat-discharging member of an electronic equipment according to the present invention.
Figure 10:
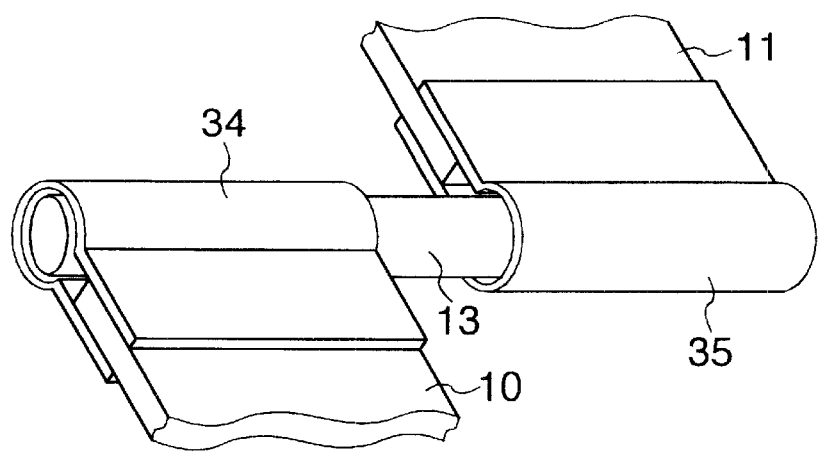
FIG. 10 is a perspective view of connection means of yet another heat-discharging member of an electronic equipment according to the present invention.

FIG. 8 to FIG. 10 which describe another example relating to the means of connection of the first heat-discharging member and second heat-discharging member in the embodiment shown in FIG. 1 and FIG. 5. FIG. 8 to FIG. 10 are views showing an insertion section of a heat-discharging member in an embodiment of an electronic equipment according to the present invention.

The embodiments shown in FIG. 1 and FIG. 5 illustrated the case where the two insertion sections consisted of an assembly of a cylindrical pillar face and cylindrical face; however, in the case of the means for connection shown in FIG. 8, an embodiment of a structure is illustrated whereby the thermal resistance at the insertion gap of these two is further reduced. The surface area is increased by screw-thread processing 31, 32 on the cylindrical pillar shaft 13 formed on second heat-discharging member 11 and cylindrically-shaped section 12 formed on first heat-discharging member 10. In the case of the casing that accommodates the display device (where the second heat-discharging member 12 is arranged), if this is assumed to be tipped over by 180° at a maximum with respect to the main casing on which is mounted the CPU etc. (in which is arranged first heat-discharging member 10), the insertion sections of the first heat-discharging member and second heat-discharging member slide in the axial direction through ½ pitch of the screw at the maximum (in the case of a JIS mesh screw, 0.25 mm for a shaft diameter of 5 mm). Consequently, a gap of at least ½ pitch is provided between cylindrically-shaped section 12 and cylindrical pillar shaft 13, or alternatively, a structure is adopted whereby displacement between the first heat-discharging member and second heat-discharging member can be absorbed (for example, a structure in which a heat-emitting section is connected with first heat-discharging member 10 using a flexible thermally conducting member 20 shown in FIG. 3).

Figure 12:
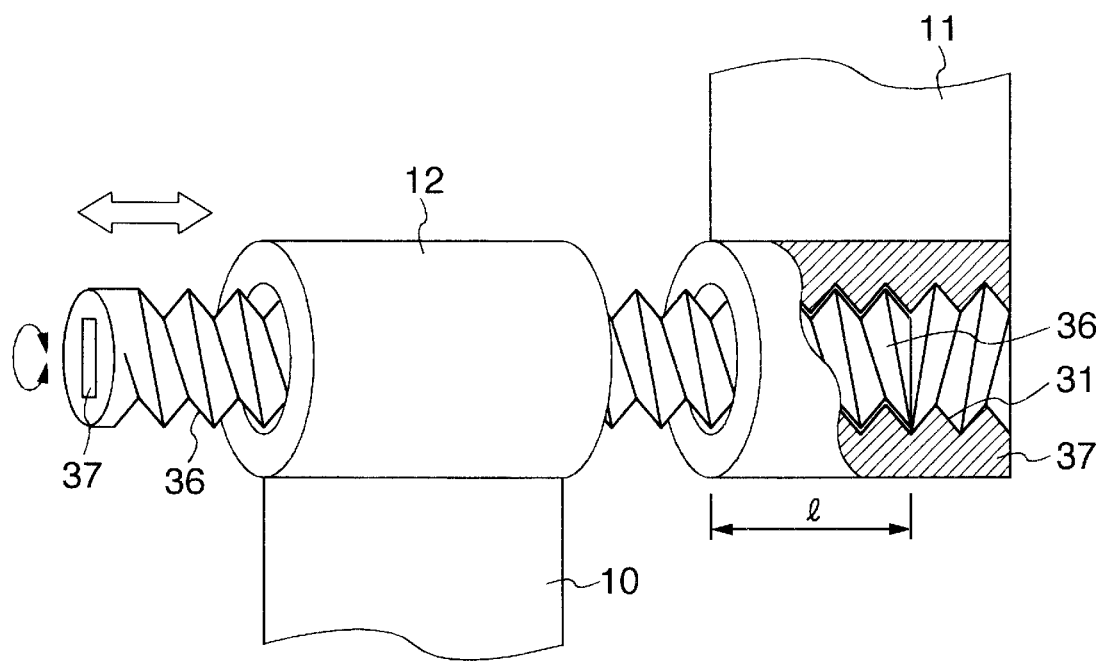
FIG. 12 is a perspective cross-sectional view of connection means of yet another heat-discharging member of an electronic equipment according to the present invention.

FIG. 12 shows an embodiment in which an insertion structure of the screw-threaded section is adopted in the case of the second heat-discharging member 11 just as in the case of the first heat-discharging member 10. In the construction shown in FIG. 12, a female screw-thread is also provided not just on the inside of cylindrical member 12 but also on the inside of cylindrical member 37 on the side of the second heat-discharging member. Heat-discharging members 10, 11 are coupled to the two cylindrical members 12, 37 by insertion of male screw-threaded member 36. Male screw-threaded member 36 is provided with a notch in its end face, so that the area of contact i.e. the area of thermal conduction can be adjusted by altering the insertion length 1 of first heat-discharging member 10 and second heat-discharging member 11 by using a tool, utilizing this notch, male screw-threaded member 36 being freely movable in its axial direction. In this case, screw-threading can be formed on the entire shaft and male screw-threaded member 36 can be freely slid with respect to first and second heat-discharging members 10, 11, so control of the area of contact of the heat-discharging members and the central shaft i.e. control of the thermal resistance becomes possible and such adjustment can be performed easily without requiring special equipment. Consequently, even in the case of maintenance or when the product specification is altered, there is no need for large alterations of the cooling structure in order to make the temperature of keyboard 4 and/or the bottom surface of first casing 6 below a desired temperature, so it is possible to cope with increases in the amount of heat generated and/or performance upgrades; since alterations in wiring etc. relating to the circuit boards and/or heat-emitting elements occurring during maintenance and/or system specification alterations can be coped with without large-scale alterations of the cooling structure, manufacturing costs can be reduced. Furthermore, since the connection area is expanded at the insertion sections of he first heat-discharging member and second heat-discharging member, thermal connection can be achieved so as to reduce thermal resistance of the first heat-discharging member and second heat-discharging member.

A further embodiment of the insertion section is shown in FIG. 9. This embodiment is an example in which the cylindrical-shaped section and cylindrical pillar shaft provided on the first and second heat-discharging members are formed by a simple and convenient processing method. In this embodiment, a member 101 that is subjected to rounding bending processing is connected at the end of second heat-discharging member 11. Furthermore, a member 100 that is subjected to rounding bending processing is also connected to the end of first heat-discharging member 10 and the two are connected by insertion of a cylindrical pillar shaped member 13 into both of these. In this case, a gap 33 is provided between the rounded bent section of first heat-discharging member 10 and cylindrical pillar shaft 13 and first and second heat-discharging members 10 and 11 are connected so as to be mutually rotatable. With this cylindrical pillar member 13, just as in the case of the first embodiment, by adjusting the insertion length e by which it is inserted, the contact area between the first heat-discharging member and second heat-discharging member can be altered, thereby enabling the thermal resistance between these to be altered. In order to facilitate this adjustment, cylindrical pillar shaped member 13 is provided with a scale 13-a to provide a standard on its surface and so can easily be adjusted to the desired rate of thermal conduction or thermal resistance. Also, in this example, lowering of costs can be achieved since the insertion sections are formed merely by a sheet member and rounded rod member and by a simple method.

It is desirable that the thickness of the sheet of the first and second heat-discharging members should be as large as possible from the point of view of heat-discharging performance. However, in the case of the means for connection shown in FIG. 9, processing of the sheet end becomes more difficult as sheet thickness is increased and processing accuracy also is more difficult to achieve. The means for connection shown in FIG. 10 is an example which is improved in this respect. In this embodiment, sheet members 34, 35 of thickness ½ of the necessary thickness from the point of view of heat-discharging performance are rounded and bent into cylindrical shape from the centre about axial shaft 13 so as to grip first heat-discharging member 10 and second heat-discharging member 11 at their ends. In this embodiment, this construction is employed for both the first and second heat-discharging members but it would be possible to adopt another construction, for example that shown in FIG. 9, for one or other of the heat-discharging members. With this embodiment, processing is facilitated since the sheet thickness can be halved for the same heat-discharging performance and bending can be performed at the centre of the sheet; also, the precision of the gap between cylindrically-shaped section 34 and axial shaft 13 can be increased. Consequently, the gap can be reduced i.e. the thermal resistance at the gap can be decreased.

Figure 11:
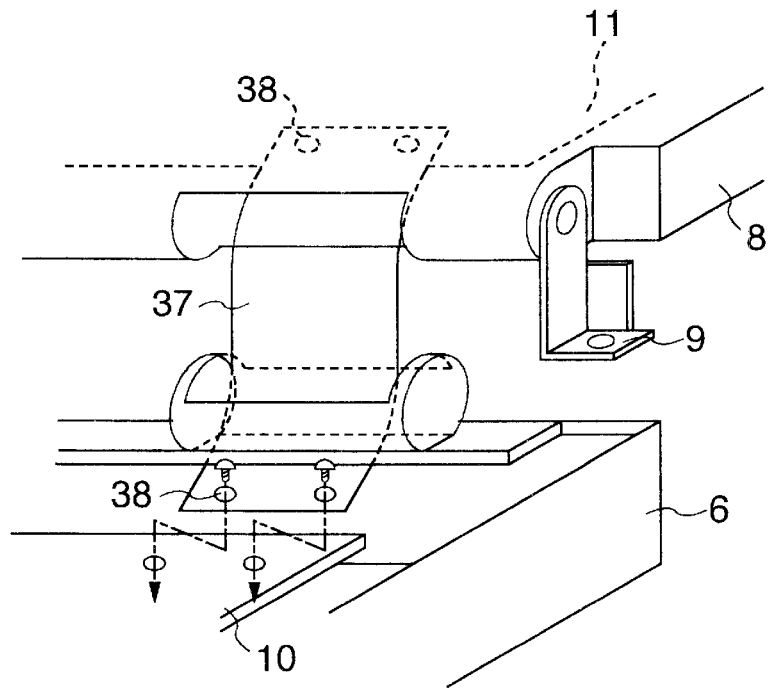
FIG. 11 is a cross-sectional perspective view of connection means of another heat-discharging member of an electronic equipment according to the present invention.

FIG. 11 shows a further embodiment of the connection sections of the first heat-discharging member and second heat-discharging member. In this example, first heat-discharging member 10 and second heat-discharging member 11 are connected by a thin sheet member 37 formed of material of high thermal conductivity (for example, copper sheet or phosphor bronze sheet of thickness 50 $\mu$tm–0.1 mm). In FIG. 11, thin sheet member 37 and first and second heat-discharging members 10, 11 are connected by a method such as fixing using for example a screw 38. When connection of first heat-discharging member 10 and second heat-discharging member 11 is performed using thin sheet member 37, thanks to the bending of thin sheet member 37, a flexible and thermal connection that follows the movement between first casing 6 and second casing 8 is achieved. Also, a plurality of thin sheets may be stacked in order to decrease the thermal resistance of the connecting section. In this case, in order to maintain flexibility between the heat-discharging members, the thin sheets are mutually joined only at the connecting section with the heat-discharging member. As shown in FIG. 10, the thin sheet member 37 is connected to the first heat-discharging member 10 in the first casing 1 by pressing it thereon using a plurality of screws; the thermal resistance of the connecting section of thin sheet member 37 which constitutes the connecting member of the first and second heat-discharging members may be adjusted by altering the number of these connecting screws. Regarding the thermal resistance at the contacting section of the two members, increasing the contact pressure, even if the apparent contact area is the same, increases the actual contact area and so enables the thermal resistance to be reduced.

Furthermore, as shown in FIG. 11, by bending the connecting section of thin sheet member 37 with first heat-discharging member 10, fixing may be effected by means, such as a screw 38 in this bent section, that press thin sheet member 37 onto the heat-discharging member 10. In this way, it is possible to adjust the contact area of the thin sheet member 37 and the heat-discharging member 10 by 15 fewer means for pressing, enabling the thermal resistance to be more easily adjusted.

Also, by making the area of connection of the two heat-discharging members at the connection section of the first and second heat-discharging members i.e. the area of thermal conduction adjustable, the rate of heat discharging to the outside from the first and second heat-discharging members can be adjusted to cope with increases in the rate of heat generation by the heat-emitting elements and/or performance upgrades without needing to make major alterations to the cooling structure, and the distribution whereby the amount of heat generated from the interior of the casing is dispersed to the entire casing can be adjusted in a simple manner so that the casing also can be appropriately cooled concurrently with cooling of the elements.

With this embodiment, flexible thermal connecting sections are formed by an uncomplicated construction so lower costs can be achieved. Also, although in the example described above, means for adjusting thermal resistance were provided on the side of the means for connecting the first and second heat-discharging members where the first heat-discharging member is connected, there is no restriction to providing it on the side of the first heat-discharging member and the same benefits could of course be obtained by providing it on the other side.

According to the present invention, irrespective of the layout of heat-emitting elements on the wiring board or the layout of equipment in the interior of the casing, an electronic equipment can be provided having a cooling construction suited to a thin light-weight casing wherein the rise in temperature of the surface of the casing that accommodates the heat-emitting elements and keyboard, etc. is restrained and which does not give the operator an uncomfortable feeling and cooling of the temperature of the heat-emitting elements is effected to a prescribed temperature.

Furthermore, an electronic equipment can be provided having a cooling structure that maintains the casing and keyboard at a temperature that does not give discomfort to the operator whilst maintaining the heat-emitting elements below a prescribed temperature by suitably dispersing to the entire device the amount of heat generated from heat-emitting elements or equipment within the casing.

Furthermore, an electronic equipment can be provided having a cooling construction wherein the rate of discharging of heat from the casing can be adjusted to cope with changes in layout of heat-emitting elements and/or equipment within the casing.

What is claimed is:

1. An electronic equipment including a first casing which is of a small thickness on which are mounted a keyboard and a wiring board, and a second casing which is of a small thickness accommodating a display device and rotatably mounted on said first casing by means of a hinge, the equipment comprising:
    at least one element that is a subject of cooling arranged within said first casing;
    a first heat-discharging member thermally connected with both said at least one element and said first casing;
    a second heat-discharging member arranged within said second casing so as to be in contact with a surface thereof; and
    connection means for thermally connecting said first heat-discharging member with said second heat-discharging member;
    wherein at least one of said first heat-discharging member and said second heat-discharging member includes a planar portion extending in parallel to a major surface of a respective one of said first casing and said second casing and in continuous thermal contact therewith over substantially an entire surface of the parallel extending planar portion.

2. The electronic equipment according to claim 1, further comprising a flexible thermally conductive member provided between said at least one element that is the subject of cooling and said first heat-discharging member.

3. The electronic equipment according to claim 1 or claim 2, further comprising a heat-discharging member arranged between said at least one element that is the subject of cooling, said keyboard and/or the bottom surface of the casing and thermally contacting said at least one element that is the subject of cooling, said keyboard and/or the bottom surface of the casing.

4. The electronic equipment according to claim 1, wherein said connection means also serves as said hinge.

5. The electronic equipment according to claim 1, wherein said connection means comprises a thermally conductive member that is connected by contacting said first heat-discharging member and said second heat-discharging member.

6. The electronic equipment according to claim 5, wherein said connection means comprises a thermally conductive member connected to said first heat-discharging member and at least a second thermally conductive member connected to said second heat-discharging member and connected in contact with said at least a first thermally conductive member.

7. The electronic equipment according to claim 5 or 6, wherein the size of the region of contact of said connection means is adjustable.

8. The electronic equipment according to claim 1, wherein the planar portion of said second heat-discharging member is in contact with the major surface of said second casing over a substantial portion of the major surface of said second casing.

9. The electronic equipment according to claim 8, wherein said second heat-discharging member is a plate member having a substantial portion thereof extending parallel to and in contact with the surface of said second casing, and being spaced from said display device.

10. The electronic equipment according to claim 1, wherein said first heat-discharging member includes the planar portion extending parallel to and in continuous thermal contact with a bottom surface of said first casing.

11. An electronic equipment including a first casing which is thin and lightweight on which are mounted a keyboard and a wiring board, and a second casing which is thin and lightweight accommodating a display device and rotatably mounted on said first casing by means of a hinge, the equipment comprising:
    at least one element that is a subject of cooling arranged within said first casing;
    a thermally conductive member thermally connected with both of said at least one element and a substantial portion of a bottom surface of said first casing; and
    connection means for thermally connecting said first casing with said second casing;
    wherein said thermally conductive member includes a planar portion extending in parallel to the bottom surface of said first casing and in continuous thermal contact therewith over substantially an entire surface of the parallel extending planar portion.

12. The electronic equipment according to claim 11, wherein said connection means also serves as said hinge.

13. The electronic equipment according to claim 11, wherein said connection means includes another thermally conductive member having a portion extending parallel to and in continuous thermal contact with a major surface of said second casing over a substantial portion thereof.

14. An electronic equipment including a first casing which is thin and lightweight on which are mounted a keyboard and a wiring board, and a second casing which is thin and lightweight accommodating a display device and rotatably mounted on said first casing by means of a hinge, the equipment comprising:
    a first heat discharging path from at least one element that is a subject of cooling arranged within said first casing to a bottom surface of said first casing through a first heat-discharging member;
    a second heat discharging path from said at least one element that is the subject of cooling to said keyboard through said first heat-discharging member thermally connected with said at least one element and the bottom surface of said first casing; and
    a third heat discharging path from said first heat-discharging member to said second casing through connection means for thermally connecting said first heat-discharging member with a second heat-discharging member arranged in and in contact with a surface of said second casing;
    wherein at least one of said first heat-discharging member and said second heat-discharging member includes a planar portion extending in parallel to a major surface of a respective one of said first casing and said second casing and in continuous thermal contact therewith over substantially an entire surface of the parallel extending planar portion.

15. The electronic equipment according to claim 14, wherein said second heat-discharging member includes a planar portion extending substantially parallel to and in continuous thermal contact with a substantial portion of the major surface of said second casing.

16. An electronic equipment including a first casing on which are mounted a keyboard and a wiring board, and a second casing accommodating a display device and rotatably mounted on said first casing by means of a hinge, the equipment comprising:

at least one element that is a subject of cooling arranged within said first casing;

a first heat-discharging member thermally connected with both said at least one element and said first casing;

a substantially planar second heat-discharging member arranged within said second casing and having a planar portion extending in parallel with a major surface of said second casing so as to be in direct and continuous thermal in contact with said major surface of said second casing over substantially an entire surface of the parallel extending planar portion;

connection means for thermally connecting said first heat-discharging member with said second heat-discharging member.

17. An electronic equipment including a first casing which is of a small thickness on which are mounted a keyboard and a wiring board, and a second casing which is of a small thickness accommodating a display device and rotatably mounted on said first casing by means of a hinge, the equipment comprising:

at least one element that is a subject of cooling arranged within said first casing;

a first heat-discharging member including a first portion thermally connected with said at least one element and a second portion thermally connected with said first portion and extending parallel to and in continuous thermal contact with a bottom surface of said first casing over substantially an entire surface of the parallel extending second portion;

a second heat-discharging member arranged within said second casing so as to be in a continuous thermal contact with a surface of said second casing which extends substantially in parallel with a display surface of said display device and is spaced from a rear surface of said display device;

connection means for thermally connecting said first heat-discharging member with said second heat-discharging member.

18. An electronic equipment including a first casing which is of a small thickness on which are mounted a keyboard and a wiring board, and a second casing which is of a small thickness accommodating a display device and rotatably mounted on said first casing by means of a hinge, the equipment comprising:

at least one element that is a subject of cooling arranged within said first casing;

a first heat-discharging member including a first portion thermally connected with said at least one element and a second portion thermally connected with said first portion and in continuous thermal contact with said first casing;

a second heat-discharging member arranged within said second casing so as to be in a continuous thermal contact with a surface of said second casing which extends substantially in parallel with a display surface of said display device and is spaced from a rear surface of said display device;

connection means for thermally connecting said first heat-discharging member with said second heat-discharging member;

wherein said second portion of said first heat-discharging member is in continuous thermal contact with a bottom surface of said first casing.

* * * * *

UNITED STATES PATENT AND TRADEMARK OFFICE
CERTIFICATE OF CORRECTION

PATENT NO. : 6,449,149 B1  
DATED : September 10, 2002  
INVENTOR(S) : Ohashi et al.

It is certified that error appears in the above-identified patent and that said Letters Patent is hereby corrected as shown below:

<u>Title page,</u>  
Should read:
-- (*) Notice: This patent issued on a continued prosecution application filed under 37 CFR 1.53(d), and is subject to the twenty year patent term provisions of 35 U.S.C. 154(a)(2)

Subject to any disclaimer, the term of this patent is extended or adjusted under 35 U.S.C. 154(b) by 0 days. --

Signed and Sealed this

Fourth Day of March, 2003

JAMES E. ROGAN  
*Director of the United States Patent and Trademark Office*